United States Patent
Hui et al.

(10) Patent No.: US 11,405,755 B2
(45) Date of Patent: Aug. 2, 2022

(54) RIDER LOCATION DETECTION AND SHARING SYSTEM

(71) Applicant: BITwave Pte Ltd, Singapore (SG)

(72) Inventors: Siew Kok Hui, Singapore (SG); Yung Kuei Gan, Singapore (SG)

(73) Assignee: BITWAVE PTE LTD., Singapore (SG)

( * ) Notice: Subject to any disclaimer, the term of this patent is extended or adjusted under 35 U.S.C. 154(b) by 54 days.

(21) Appl. No.: 16/945,062

(22) Filed: Jul. 31, 2020

(65) Prior Publication Data

US 2021/0037351 A1 Feb. 4, 2021

Related U.S. Application Data

(60) Provisional application No. 62/881,857, filed on Aug. 1, 2019.

(51) Int. Cl.
| | |
|---|---|
| *H04W 4/08* | (2009.01) |
| *H04W 4/02* | (2018.01) |
| *H04W 4/029* | (2018.01) |
| *H04W 76/14* | (2018.01) |
| *H04W 76/40* | (2018.01) |
| *H04W 4/90* | (2018.01) |
| *G10L 13/00* | (2006.01) |

(Continued)

(52) U.S. Cl.
CPC ............. *H04W 4/08* (2013.01); *A42B 3/042* (2013.01); *A42B 3/046* (2013.01); *A42B 3/303* (2013.01); *G06T 11/00* (2013.01); *G10L 13/00* (2013.01); *H04W 4/024* (2018.02); *H04W 4/027* (2013.01); *H04W 4/029* (2018.02); *H04W 4/90* (2018.02); *H04W 76/14* (2018.02); *H04W 76/40* (2018.02); *H04B 2001/3866* (2013.01); *H04L 63/083* (2013.01)

(58) Field of Classification Search
CPC ....... H04W 4/08; H04W 4/023; H04W 4/024; H04W 4/027; H04W 4/029; H04W 4/90; H04W 76/14; H04W 76/40; H04W 76/50; H04B 2001/3866; H04B 1/385; H04L 63/083; A42B 3/042; A42B 3/0433; A42B 3/046; A42B 3/303; A42B 3/30; G10L 13/00; G06T 11/00

See application file for complete search history.

(56) References Cited

U.S. PATENT DOCUMENTS

| | | | |
|---|---|---|---|
| 2015/0173676 A1* | 6/2015 | Greenwald | ............ A63B 71/10 600/595 |
| 2015/0356853 A1* | 12/2015 | Cronin | .............. H04M 1/72421 340/669 |

(Continued)

*Primary Examiner* — Diane D Mizrahi

(74) *Attorney, Agent, or Firm* — Amin, Turocy & Watson, LLP

(57) ABSTRACT

Rider location and acceleration sharing systems are provided herein. For instance, a system is paired with a wireless transceiver, mountable to or within headwear that outputs location data and accelerometer data associated with the user identity to a user device. Once members of the group of user devices are validated for movement together, an emergency event associated with a member of the group may be identified based on the accelerometer data or the location data, and, in response to the emergency event, emergency event data is sent to the respective other user devices, and other information is enabled to be received from any of the respective other user devices.

20 Claims, 16 Drawing Sheets

(51) Int. Cl.
*G06T 11/00* (2006.01)
*A42B 3/04* (2006.01)
*A42B 3/30* (2006.01)
*H04W 4/024* (2018.01)
*H04B 1/3827* (2015.01)
*H04L 9/40* (2022.01)

(56) References Cited

U.S. PATENT DOCUMENTS

| | | | |
|---|---|---|---|
| 2017/0284817 A1* | 10/2017 | Greenspan | G01C 21/3492 |
| 2019/0159009 A1* | 5/2019 | Barash | H04W 4/90 |
| 2019/0234740 A1* | 8/2019 | Gab | G01C 21/20 |
| 2019/0282324 A1* | 9/2019 | Freeman | G09B 23/288 |
| 2019/0347710 A1* | 11/2019 | Polakala | G06Q 30/0224 |
| 2020/0074839 A1* | 3/2020 | Trigg | G06F 16/43 |
| 2020/0252780 A1* | 8/2020 | McClendon, IV | G06F 21/44 |

* cited by examiner

RIDER LOCATION DETECTION AND SHARING SYSTEM

CROSS-REFERENCE TO RELATED APPLICATIONS

This application claims priority to U.S. Provisional Patent Application No. 62/881,857, filed on Aug. 1, 2019, and entitled "System and Apparatus for Rider Location Detection, Classification and Reporting." The entirety of the aforementioned application is hereby incorporated by reference herein.

TECHNICAL FIELD

The subject disclosure relates to a rider location system, and more specifically, to a system for location and rider information, e.g., with a group of devices synced to the system.

BACKGROUND

Location systems can utilize global satellite positioning in order to track location in real time making them highly describable for determining location relative to a geographic map. Additionally, accelerometer systems can utilize accelerometers to measure rapid acceleration or deceleration of objects making them highly desirable for use in transportation industries and vehicles.

In conventional location and accelerometer systems, the data generated by the system is typically not shareable, especially on a large scale with other users. This in turn makes real time tracking and monitoring of a user's location and status difficult especially with users spread across multiple vehicles that can be easily separated. As a result, it is desirable to implement techniques to enable users to easily and efficiently share real time location and acceleration data to keep track of each other better, more responsively, and more precisely.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a rider location system is described herein. The rider location system includes a memory that stores computer executable components and a processor that executes computer executable components stored in the memory. The computer executable components can included a paring component that pairs the system to a wireless transceiver that is communicatively coupled to a location system that outputs location data and an accelerometer that outputs accelerometer data, a communications component that obtains location and accelerometer data from the wireless transceiver, a group management component that enables the creation and modification of a group of user identities, an emergency event detection component that identifies an emergency event associated with a user identity based on location or accelerometer data, and a group sharing component that enables sending of location, accelerometer, or emergency event data to respective user devices associated with the group.

In another aspect, a method is described herein. The method can include, in response to acceptance of a request, from a user device associated with a user identity, to connect the user identity to a group identity comprising a group of user identities, receiving, from the user device, accelerometer data and location data from a location system and an accelerometer paired with the user device, and sharing, with the user device, respective location data and respective acceleration data from respective location systems and respective accelerometers paired with other user devices, other than the user device associated with other user identities of the group of user identities, other than the user identity; and based on an analysis of the location data and the respective location data, and the accelerometer data and the respective acceleration data, determining that a person associated with one of the group of user identities has been in a potential crash according to a threshold crash likelihood criterion, and alerting, via a communication network, user devices associated with the group of user identities that the person has been in the potential crash.

In an additional aspect, a non-transitory machine-readable medium including executable instructions described herein. The instructions, when executed by a processor, can facilitate performance or operations, comprising: in response to approval of a request according to a security protocol, from a user device associated with a user identity, to join the user identity to a group identity comprising a group of user identities, receiving, from the user device, acceleration data and location data obtained by the user device from headgear, comprising a location system and an accelerometer, wirelessly coupled to the user device, and sending, to the user device, respective location data and respective acceleration data received from other user devices, other than the user device, via respective headgear, comprising respective location systems and respective accelerometers, wirelessly coupled to the other user devices, wherein the other user devices are associated with other user identities of the group of user identities, other than the user identity; and based on an analysis of the location data and the respective location data, and the accelerometer data and the respective acceleration data, determining that a person associated with one of the group of user identities has become geographically separated from other people associated with the group of user identities, other than the person, according to a threshold distance associated with the group of user identities that the person has become geographically separated from the other people.

These and other embodiments are described further below.

BRIEF DESCRIPTION OF THE DRAWINGS

Various non-limiting embodiments of the subject disclosure are described with reference to the following figures, wherein like reference numerals refer to like parts throughout unless otherwise specified.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

Various specific details of the disclosed embodiments are provided in the description below. One skilled in the art will recognize, however that the techniques described herein can in some cases be practiced without one or more of the specific details, or with other methods, components, materials, etc. In other instances, well-known structures, materials, or operations are not shown or described in detail to avoid obscuring certain aspects.

Various aspects described herein provide techniques by which motorsport riders, biking enthusiasts, or other mobile groups of people, can share and keep track of each other's location and well being while riding. In general, motorsport and biking enthusiasts enjoy riding together in groups. During these rides, participants look out for each other due to the inherent dangers and potential obstacles involved in riding. However, due to the nature of the activity, riders may not immediately notice if a member of their group has become separated or involved in an accident. Further, if a member or members of the group become separated or involved in an accident, they may be unable or have significant difficulty in notifying or locating the other group members.

To address the issues noted above, embodiments described herein enable the sharing of location and potential emergency event data and notifications between user devices carried by a group of riders. This ensures that members of a group can quickly and efficiently be notified of separation of or an accident involving one or more group members. Furthermore, this can assist separated group members in quickly and efficiently rejoining the rest of the group.

Figure 1:
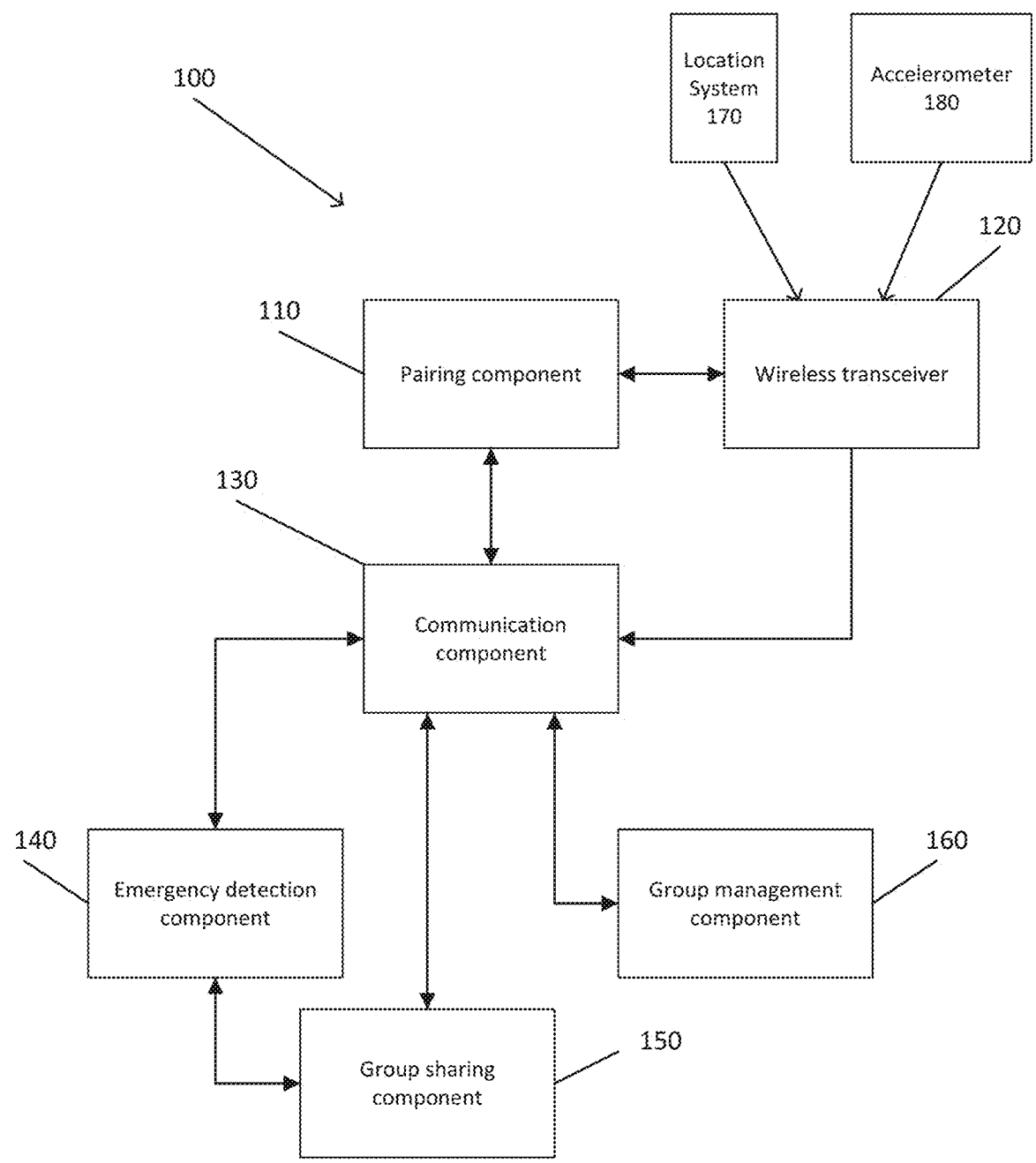
FIG. 1 illustrates a system that facilitates sharing location, acceleration, and emergency data within a group of riders in accordance with various aspects described herein.

With reference now to the drawings, FIG. 1 illustrates a system 100 that facilitates sharing location, acceleration, and emergency data within a group of riders in accordance with various aspects described herein. As shown in FIG. 1, system 100 includes a paring component 110 that can pair the system to a wireless transceiver 120 connected to a location system and an accelerometer system and mounted to a helmet. Various implementations can be utilized for the wireless transceiver such as but not limited to, Wi-Fi and Bluetooth transceivers.

System 100 as shown in FIG. 1 also includes a communications component 130 that can communicate with the wireless transceiver 120 in order to facilitate the transfer of location data and accelerometer data to the system. System 100 further includes a group management component 160 that allows for the creation of groups of user identities from respective user devices associated with user identities after sending and accepting respective requests to join the group from respective user devices. The group management component 160 further allows for the modification of identities within the group of identities, removal of identities from the group, and deletion of the group of identities. Accordingly, system 100 can allow for one or more riders to create or join a group of user identities.

Additionally, system 100 contains an emergency event detection component 140. The emergency event detection component 170 identifies potential emergency events associated with a user identity based on information such as user input or accelerometer or location data and then generates emergency event data representative of the event. Furthermore, system 100 contains a group sharing component 150 that enables sending of to respective user devices emergency event data in response to an emergency event and enables receiving of information from any respective user devices. Accordingly, system 100 allows for the creation of groups of user identities associated with user devices, the collection of location and acceleration data from user devices associated with user identities, analysis of location an acceleration data to determine if a user identity has been involved in an emergency event, and sharing of notification of an emergency event to the group of user identities that an identity of the group has been involved in an emergency event.

In an embodiment, additional components could also be added to the system. For example, a group navigation component could be added to the system. This component would allow for the creation of group navigational routes including a starting point for the group, an ending point for the group, and possible routes and directions for the group to travel from the starting point to the ending point. This component would allow for sharing of group members distance from the starting and ending points, as well as the progress along the route. Additionally, this component could help prevent group members from becoming lost, as they would still have route instructions even if separated from the group.

In one embodiment, a system 100 associated with a user identity comprises a memory that stores computer executable components, or a processor, operably coupled to the memory, and that executes computer executable components stored in the memory. As mentioned, the computer executable components can comprise a pairing component 110 that pairs the system 100 with a wireless transceiver 120 mountable to or within headwear, e.g., a protective helmet (not shown), the wireless transceiver 120 being communicatively coupled to a location system 170 that outputs location data representative of a location associated with the user identity and an accelerometer 180 that outputs accelerometer data representative of an acceleration associated with the user identity. Further, system 100 can include a communications component 130 that communicates with the wireless transceiver, and obtains the location data and the accelerometer data. Additionally, a group management component 160 enables a) creation of a group of user identities comprising the user identity and other designated user identities other than the user identity, based on receiving respective validations to join the group of user identities from respective user devices associated with the other designated user identities after sending respective requests to join the group to the respective user devices, b) modification of a number of identities in the group of user identities, and c) deletion of the group of user identities.

Furthermore, system 100 can include an emergency event detection component 140 that identifies an emergency event associated with the user identity based on at least one of user input associated with the user identity, the accelerometer data or the location data, and generates emergency event data representative of the emergency event. Additionally, a group sharing component 150 a) enables sending of first information to the respective user devices, b) enables sending, in response to the emergency event, the emergency event data to the respective user devices, and c) enables receiving of second information from any of the respective user devices.

The modification of the group of user identities by the group management component can be enabled after reception of a common password associated with the group that was generated during the creation of the group. The deletion of the group of user identities by the group management component can enabled after reception of the common password. Also, the respective validations can be enabled after reception of the common password for the group.

The wireless transceiver 120 can comprises at least one of a Wi-Fi transceiver, a Bluetooth transceiver, or a communications network transceiver. In an example embodiment, the accelerometer 180 and the location system 170 are at least one of mounted within, or mountable to, the headwear. In an example embodiment, the pairing component 110 further pairs the accelerometer 180 and the location system 170 of the system 100 with the wireless transceiver 120. In another example embodiment, the location system 170 can comprise at least one of a global positioning system component, a Wi-Fi network location system, or a communications network location system. Optionally, the system is mounted to or within the headwear.

In an example embodiment, an audio output device can also be included that renders audio data determined from messages received from the respective user devices, and the audio output device can render the audio data determined from the messages based on a text to speech conversion process applies to the messages. Furthermore, the headwear can comprise an augmented reality display that renders emergency information in response to reception of other emergency event data from a user device of the respective user devices related to an emergency that has happened associated with one of the user identities of the group of identities. The augmented reality display can render at least one of route information or direction information related to a route or direction to undergo, respectively, in order to move to an area where the emergency associated with the one of the user identities happened.

Optionally, group sharing component 150 can also include a navigational component that enables generation and sharing of route data, with the respective user devices, representative of a navigational route to be followed by members of the group of user identities as part of participation in the group.

Additionally, the system can comprise a smartphone comprising the navigational component, and wherein the communications component interfaces with the headgear via the wireless transceiver to render information related to the navigational route.

Figure 2:
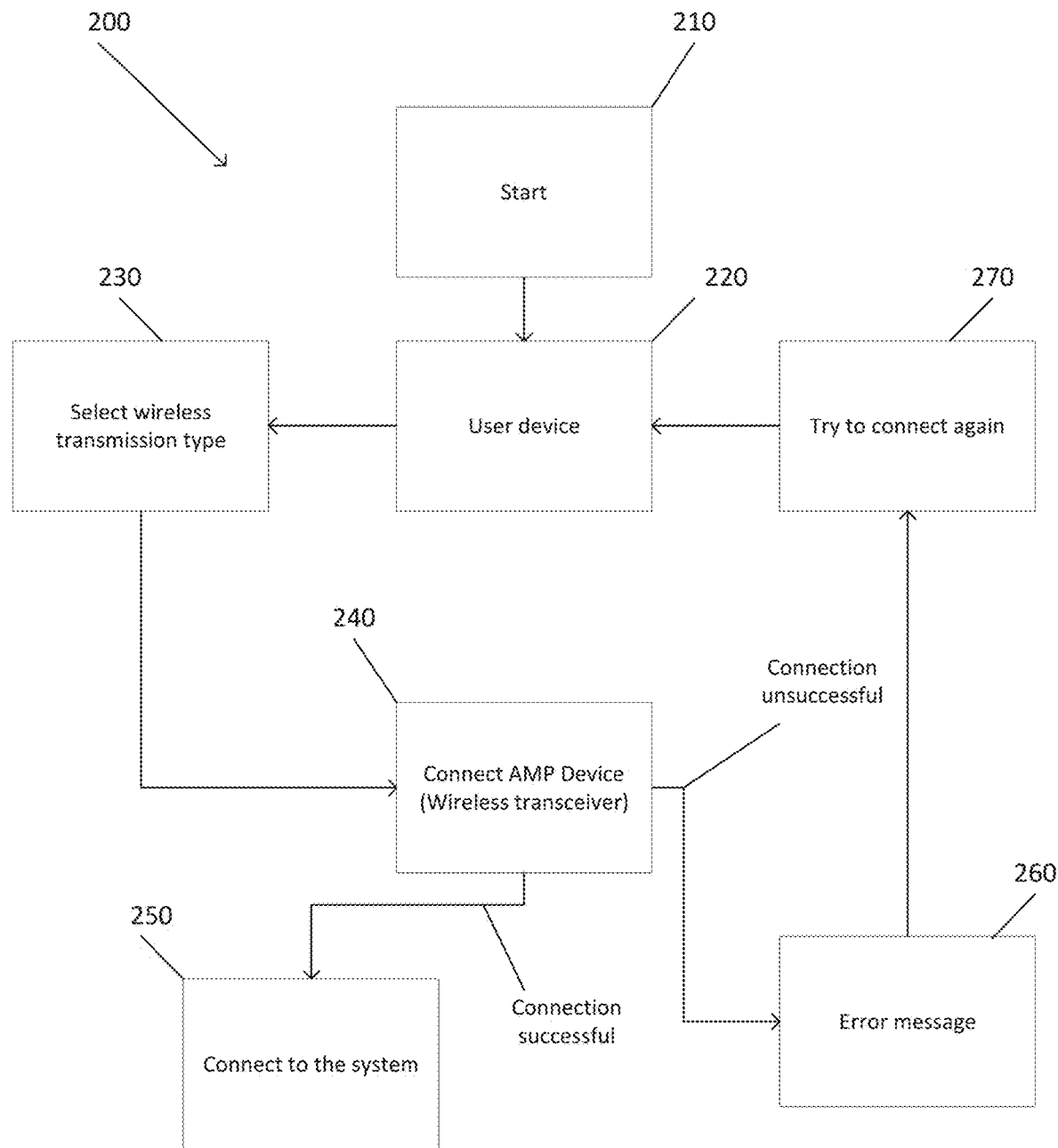
FIG. 2 illustrates a flow diagram of a wireless transceiver being paired to the system in accordance with various aspects described herein.

With reference now to FIG. 2, a flow diagram of a wireless transceiver 240 being paired to the system. At 230, a user selects what mode or wireless transmission is to be used for the user device. At 240, the user device attempts to connect to a wireless transceiver based on the user input at 230. If the user device successfully connects to the wireless transceiver, then the user device and the wireless transceiver are successfully connected to the system at 250. If the user device fails to connect to the wireless transceiver, then an error message is produced at 260. If an error message is produced at 260, then the user is prompted to try to connect again at 270.

Figure 3:
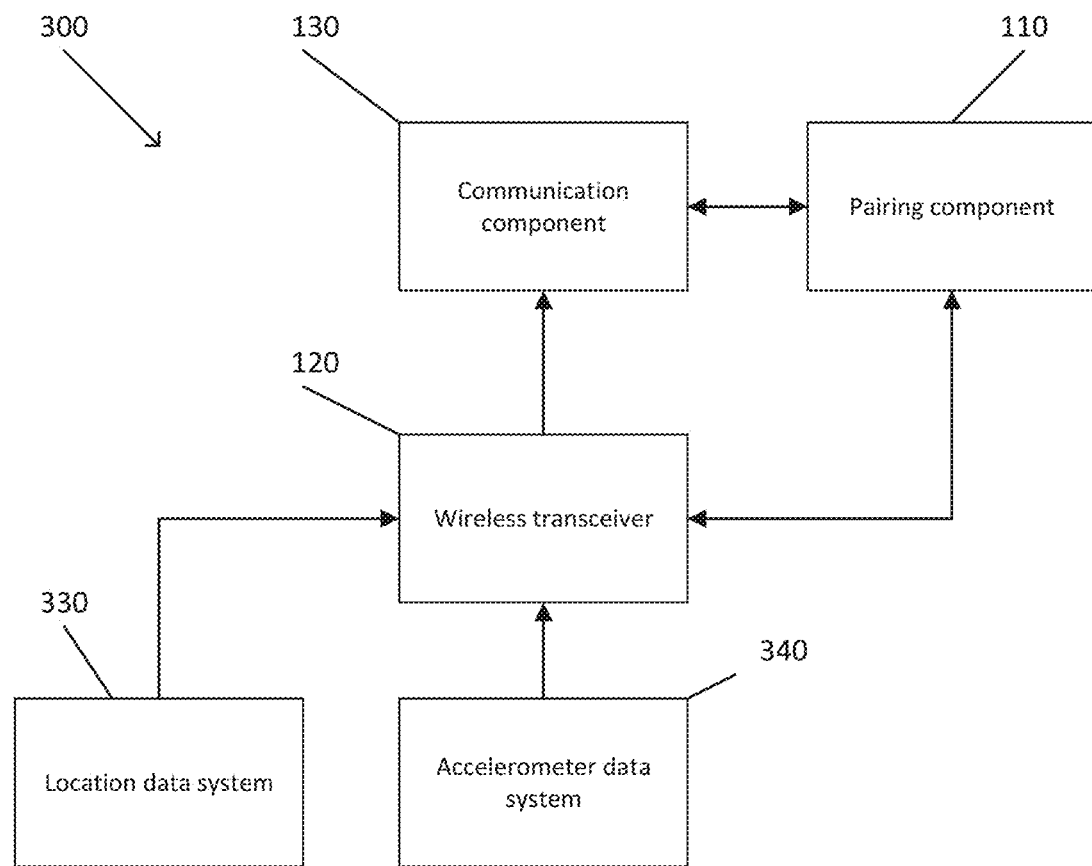
FIG. 3 illustrates a block diagram of a system that can facilitate communication between the system, a location data system, and an accelerometer data system via a wireless transceiver in accordance with various aspects described herein.

Turning now to FIG. 3, a block diagram of a system 300 that facilitates communication between the system 100, a location data system 330, and an accelerometer data system 340 via a wireless transceiver 120. In an aspect, the wireless transceiver can be a Wi-Fi transceiver than can receive location data and accelerometer data from the location data system 330 and the accelerometer data system 240 respectively, and broadcast said data on a Wi-Fi frequency. Other forms of wireless transceivers could also be used in addition to, or in place of, the Wi-Fi transceiver. For instance, the wireless transceiver 120 could also be a Bluetooth transceiver and/or broadcast a wireless signal according to any other suitable wireless transmission means. In an embodiment, a smart phone containing a global positioning system (GPS) and an accelerometer can serve as the location data system 330 and as the accelerometer data system 340. Other forms of location data systems and accelerometer data systems could be used in addition or in place of a smart phone. For instance, a dedicated purpose-built location data system and accelerometer data system could be used. Additionally, the location data system could utilize a method other than, or in addition to, GPS. For example, the location data system could utilize triangulation of cell towers and/or any other method for obtaining location tracking.

In an embodiment, additional data systems beyond a location data system and an accelerometer data system could be communicatively connected to the wireless transceiver 120. For example, a user vitals monitoring system could be communicatively connected to the wireless transceiver 120 and paired to the system. This would allow group members to be notified of the vital signs of a group member involved in an emergency event. Additionally, a user vitals monitoring system could be used to alert group members to a user having a potentially dangerous health related incident before an emergency event takes place, allowing group members to check on the user and prevent a potential accident.

In another embodiment, a vehicle status data system could be communicatively connected to the wireless transceiver. This would allow for data on a user's vehicle to be shared with group and allow for group notification is a vehicle belonging to a member of the group was experiencing maintenance or performance issues. This additional information could be beneficial in notifying the other members of the group as to whether a rapid deceleration of a user was due to an accident or due a maintenance issue that required stopping.

Figure 4:
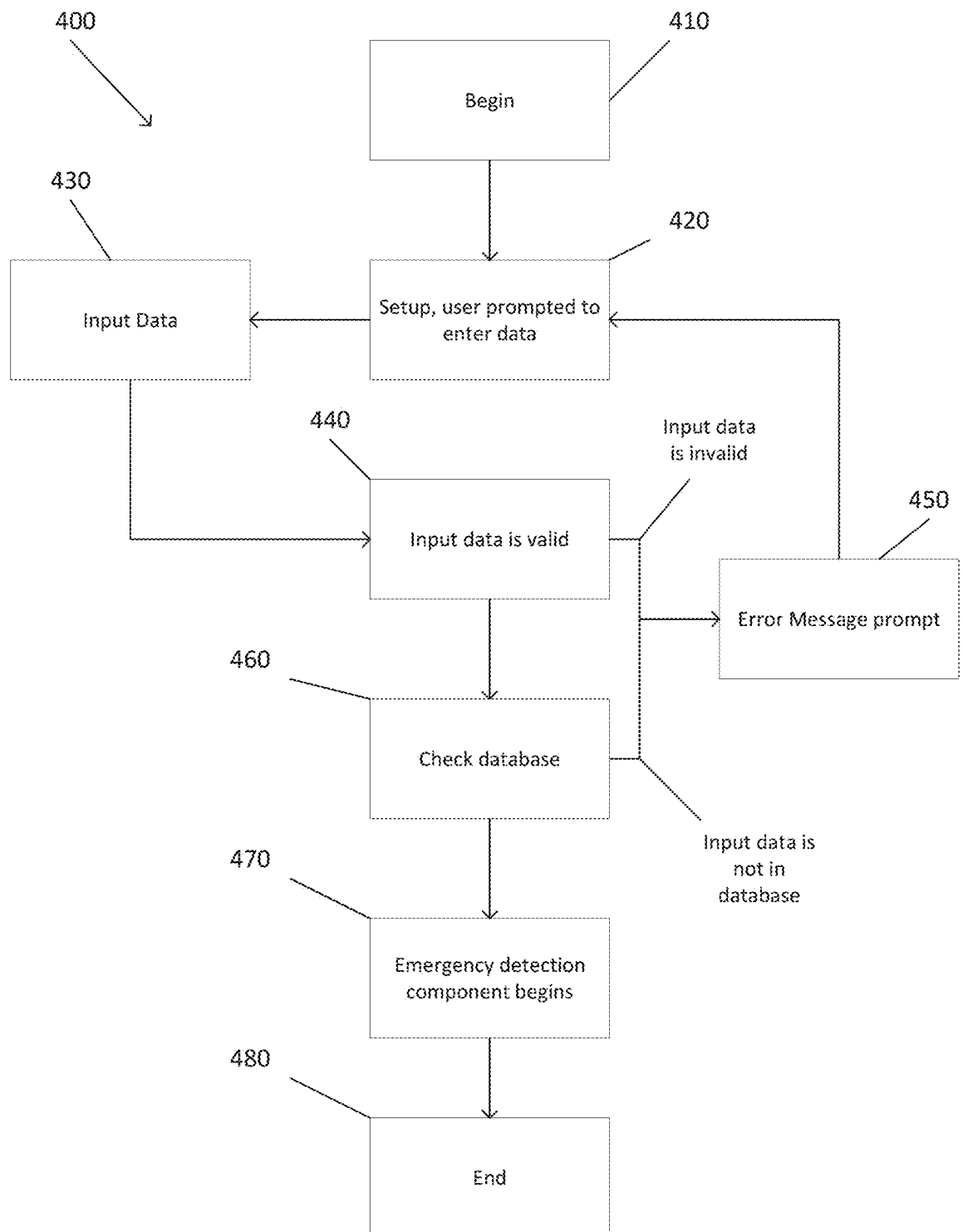
FIG. 4 illustrates a flow diagram of an example user registration process in accordance with various aspects described herein.

Turing now to FIG. 4, a flow diagram of an example user registration process.

At 420, the user is prompted to input registration data. In an embodiment, registration data requested could include information such as name, phone number, group name, and password. At 430, the user inputs data in response to what is prompted at 420. At 440, the input data is checked to ensure it is in a valid format. If the input data is valid, then data is cross referenced with the database at 460. In an embodiment, this process can include checking if the group name entered exists, if the user received an invite to join the group, of if an existing group member has approved the user join the group. If the input data is invalid, then an error message is prompted at 450, and the user is prompted to input data again at 420. If the input data passes the database check, then the emergency detection component begins at 470, and the registration process is complete at 480. If the input data fails the database check, then an error message is prompted at 450, and the user is prompted to input data again at 420.

In an embodiment, a group password, or a temporary password, can be used as an acceptance mechanism for a user to join a group. This password could take multiple forms such as a text-based phrase or a geometric shape. Other forms of acceptance mechanisms can be used in addition to, or in place of, a password. For example, an acceptance mechanism requiring a user to receive an invitation to join the group, or an approval from an existing group member could be used.

Figure 5:
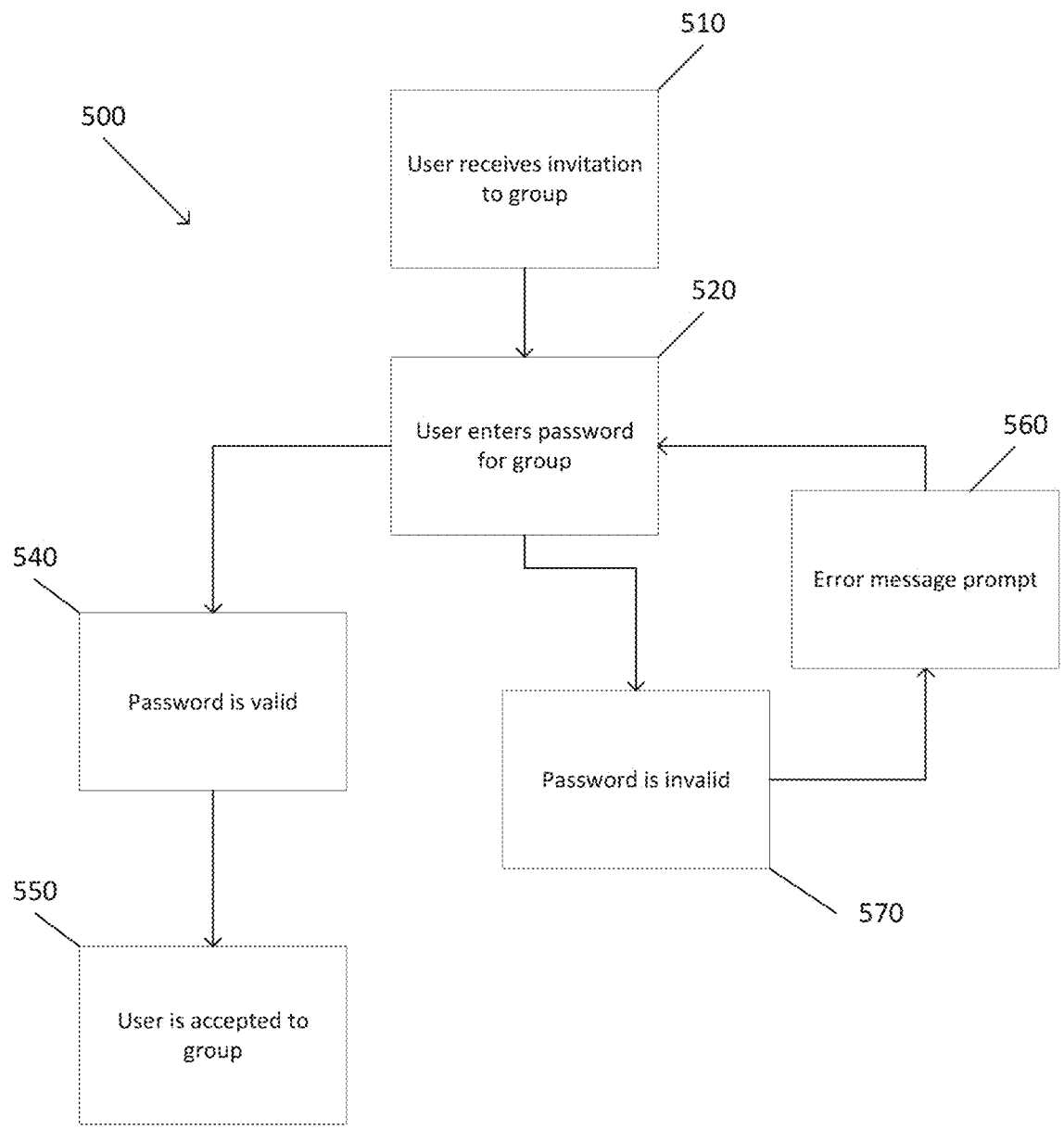
FIG. 5 illustrates a flow diagram of an acceptance process that utilizes both a password and an invitation in accordance with various aspects described herein.

FIG. 5 shows a flow diagram of an acceptance process that utilizes both a password and an invitation. At 510, the user receives an invitation to join the group. Acceptance of this invite will prompt the user to enter a password. At 520, the user enters a password applicable to the group. In response to the password passing verification 540, then the user is accepted to the group at 550. In response to the password being invalid at 570, then an error message is prompted at 560. In response to the error message at 570, then the user is prompted to re-enter the password at 520.

Figure 6:
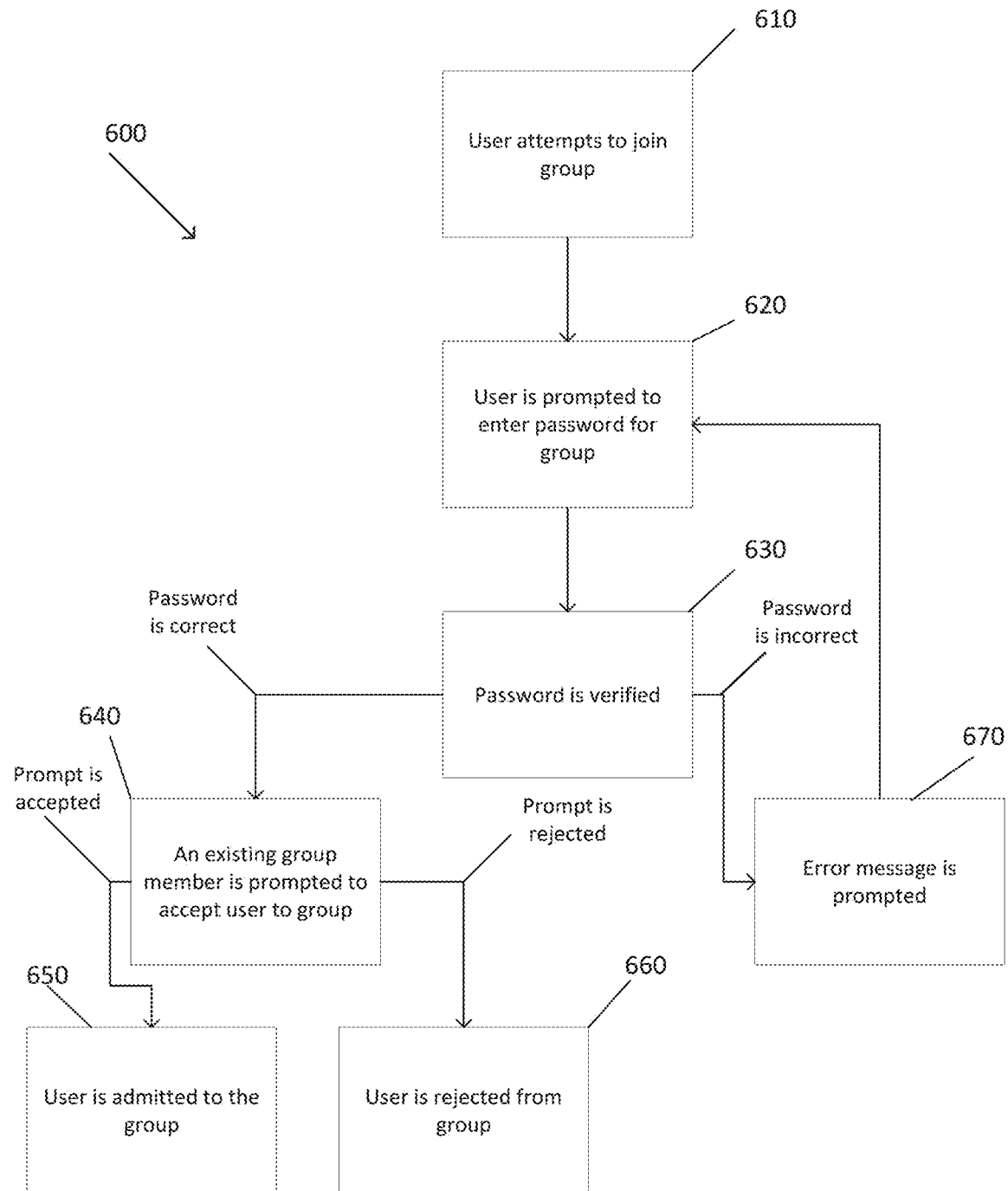
FIG. 6 illustrates a flow diagram of an acceptance process that utilizes both a password and a group member approval in accordance with various aspects described herein.

FIG. 6 shows a flow diagram of an acceptance process that utilizes both a password and a group member approval. At 610, a user attempts to join the group. In response to the attempt at 610, the user is prompted to enter a password at 620. At 630, the password is verified to check if is correct. In response to the password passing verification at 630, at 640, one or more existing group members are prompted to accept the user to the group. In response to an existing group member accepting the prompt at 640, at 650, the user is admitted to the group. In response to an existing group member rejecting the prompt at 640, at 650, the user is rejected from the group. In response to the password failing verification at 630, at 670, an error message is prompted. In response to the error message at 670, the user is prompted to re-enter the password at 620.

In an embodiment, the group management component can allow the designation of how many and which existing group members will receive a prompt to accept the user to the group. This allows for a group to better manage who has power to accept or reject new users in accordance with group dynamics. In another embodiment, the group management component can allow for the designation of how many existing group members must accept a prompt from the user in order for the user to be accepted into the group. Again, this gives existing group members more options and control when it comes to how they manage the size and composition of their group. The group management component can allow for the designation of one or more group administrators with the ability to remove group members or disband the group.

Figure 7:
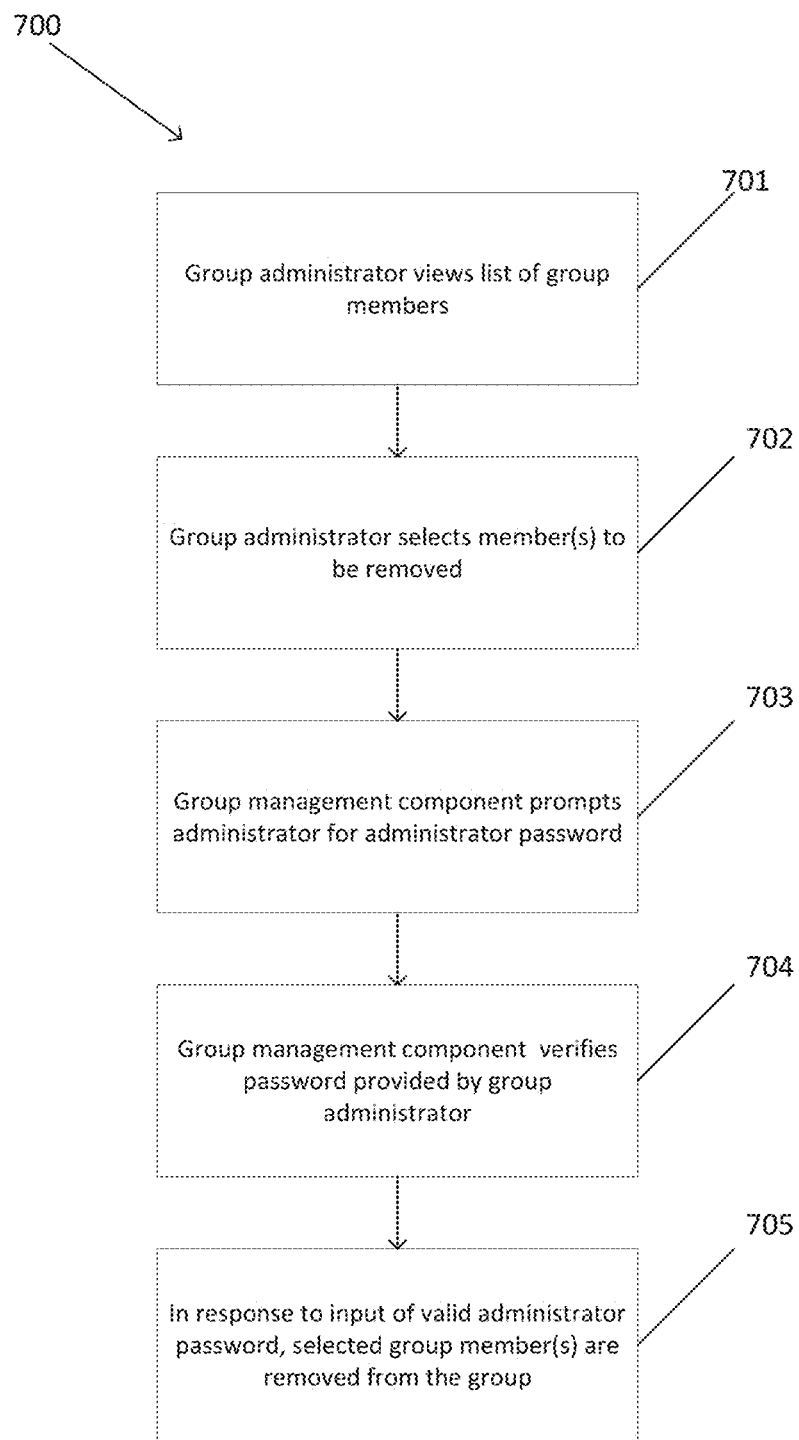
FIG. 7 illustrates a flow diagram of a process for a group administrator to remove a group member in accordance with various aspects described herein.

Turing now to FIG. 7 a flow diagram of a process for a group administrator to remove a group member. At 701, the group administrator views the list of group members. At 702, the group administrator selects member(s) of the group to be removed. At 703, the group management component prompts the administrator for the administrator password. At 704, the group management component verifies the password provided by the group administrator. In response to the successful verification of the administrator password at 704, at 705, the selected group member(s) are removed.

Figure 8:
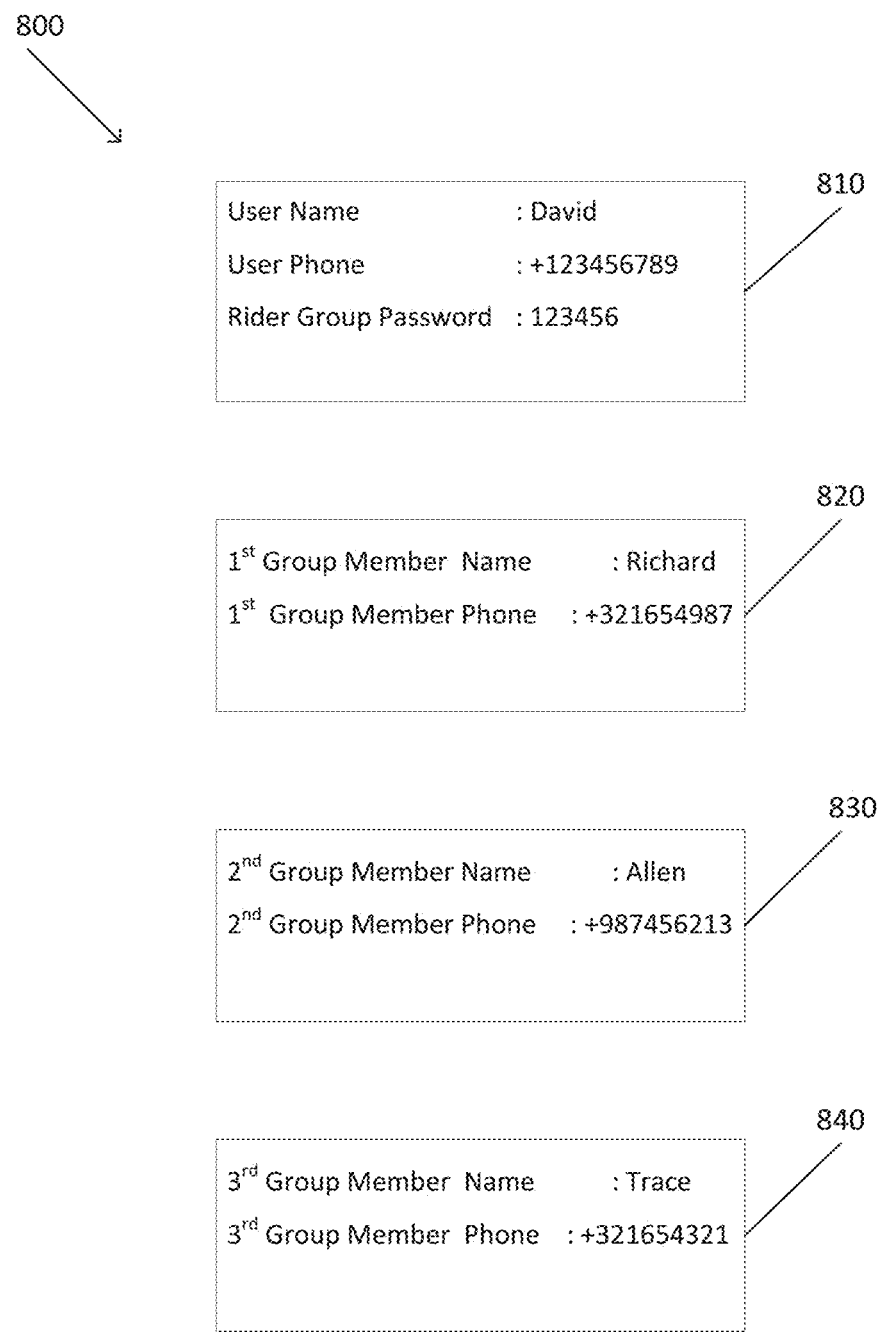
FIG. 8 illustrates an example of the data a user could input to join a group in accordance with various aspects described herein.

With reference now to FIG. 8, an example of the data a user could input to join a group. Here, a user would input a name, phone number, and group password 810. Likewise, all other users who wish to join the group would have to input their corresponding information 820-840. It should be noted that the input data could be any set of input prompts and not just those discussed in this description. For example, in another embodiment, a user could also input a group name, vehicle registration and license number, vehicle make and model, and/or emergency contact information to be contacted in case of an incident. In another embodiment, the required input data to join a group could vary on a group to group basis, with the group management component allowing existing group members to modify and select what input data a user must provide in order to join a group. This would allow for groups members to tailor the input information to best suit its members based on concerns such as increased ride safety, data security/privacy, and group member dynamics.

Figure 9:
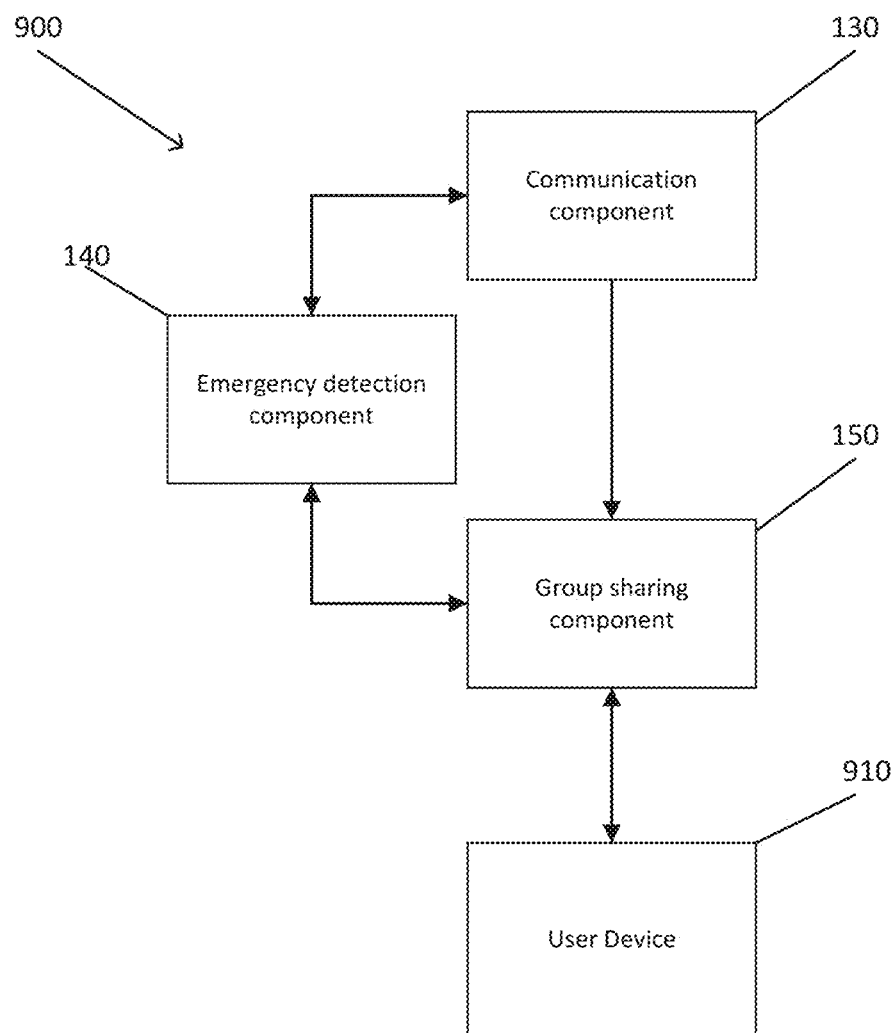
FIG. 9 illustrates a block diagram of a system, that facilitates sharing of location and acceleration data between user devices associated to user identities belonging to a group and notification of user devices of an emergency event from the emergency detection component in accordance with various aspects described herein.

With reference now to FIG. 9, a block diagram of a system 900, that facilitates sharing of location and acceleration data between user devices 910 associated to user identities belonging to a group and notification of user devices of an emergency event from the emergency detection component 140. In an embodiment, the user device 910 can be a smart phone that receives data from the group and emergency notifications. Other forms of use devices 910 could also be used in addition, or in place of a smart phone. For example, the user device could include an augmented reality display. This augmented reality display could take the forms such as that of a visor in a helmet, a contact lens, a windscreen with built in visual display, or a pair of glasses containing a visual display. This type of augmented display would further improve rider safety and access to group data, as it could be displayed without the rider taking their eyes off the road. In an aspect, the emergency notification sent by the group sharing component 150 can be a text notification intended for display on the display of a user device 910 such as a screen. Other forms of notification could also be used in addition to, or in place of, the text notification. For example, the notification could be an audio notification sent by the group sharing component 150.

Figure 10:
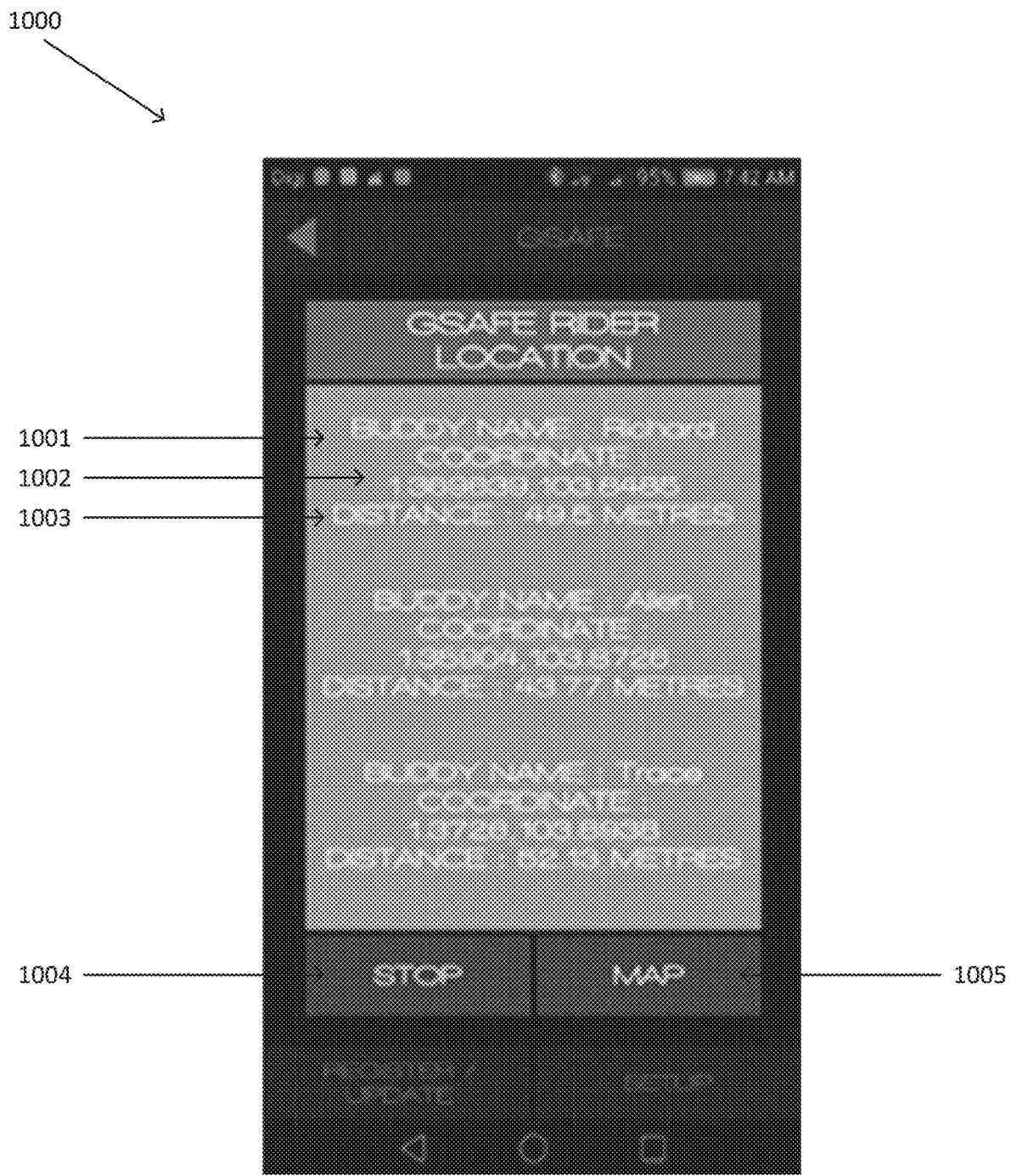
FIG. 10 illustrates an example of how group location data shared by the group sharing component can be presented by the user device in a text-based interface, displaying group member coordinates, statistics, distance from the user viewing the information, etc. in accordance with various aspects described herein.

FIG. 10 serves as an example of how group location data shared by the group sharing component 150 can be presented by the user device in a text-based interface displaying. This can include displaying the name of a group member 1001, the location coordinates of the group member 1002, and the distance between the user and the group member 1003. This can also include a stop button to stop sharing the user's information 1004, and a map button to switch to a map-based interface 1005. In an embodiment, this interface could also display the emergency status of members of the group or the speed of other members of the group.

Figure 11:
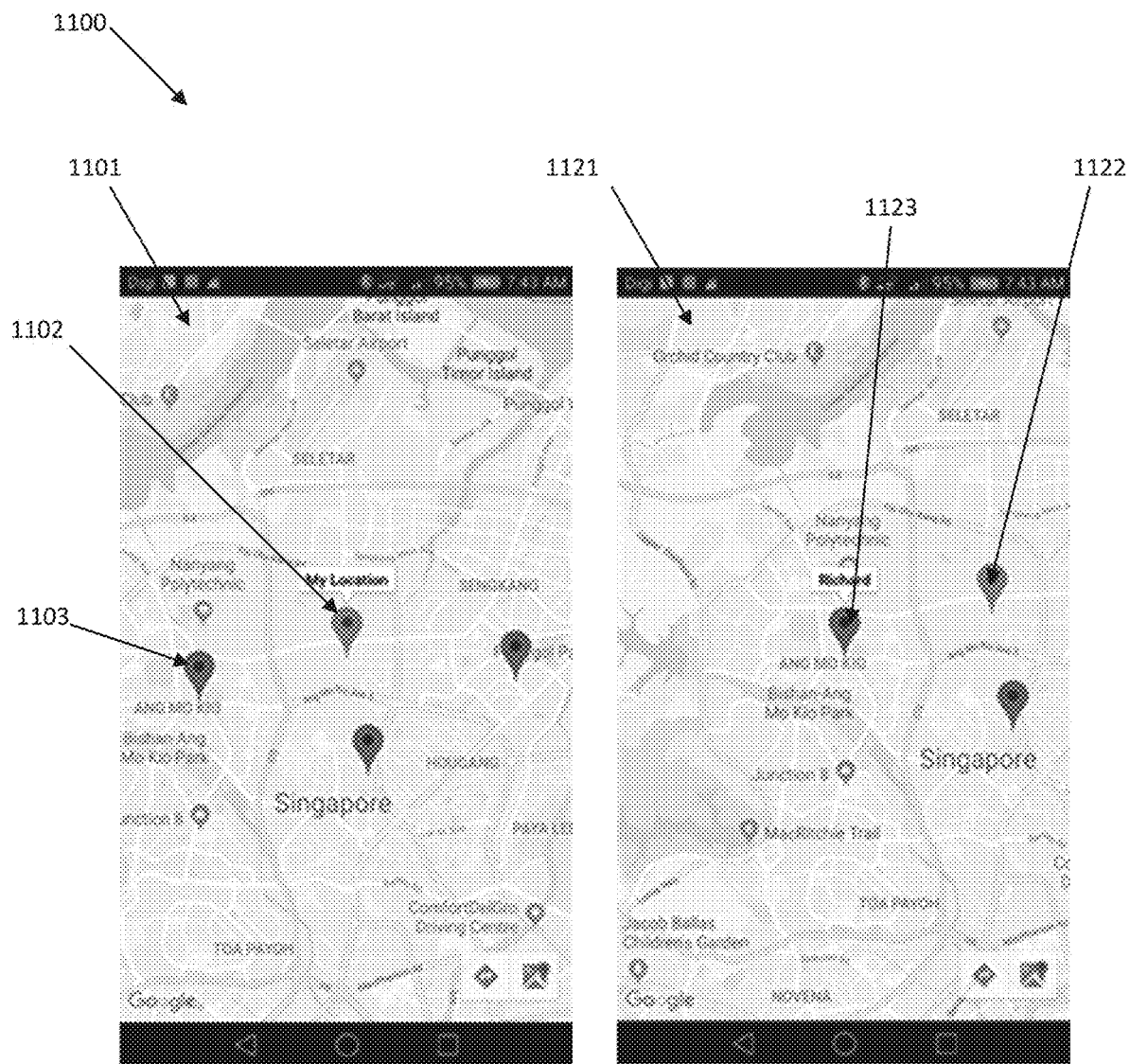
FIG. 11 illustrates a map-based interface displaying group members location in relation to each other on the map in accordance with various aspects described herein.

For example, FIG. 11 shows a map-based interface displaying group members' locations in relation to each other on the map. This map interface can be displayed centered on the user 1101, showing the user's location 1102 and the location of other group members 1103. This map interface can also be displayed centered on another member of the group 1121, showing the member upon which, it is centered 1123, and displaying the user's location 1122. In an embodiment, this map interface could also show the name and emergency status of members of the group.

Figure 12:
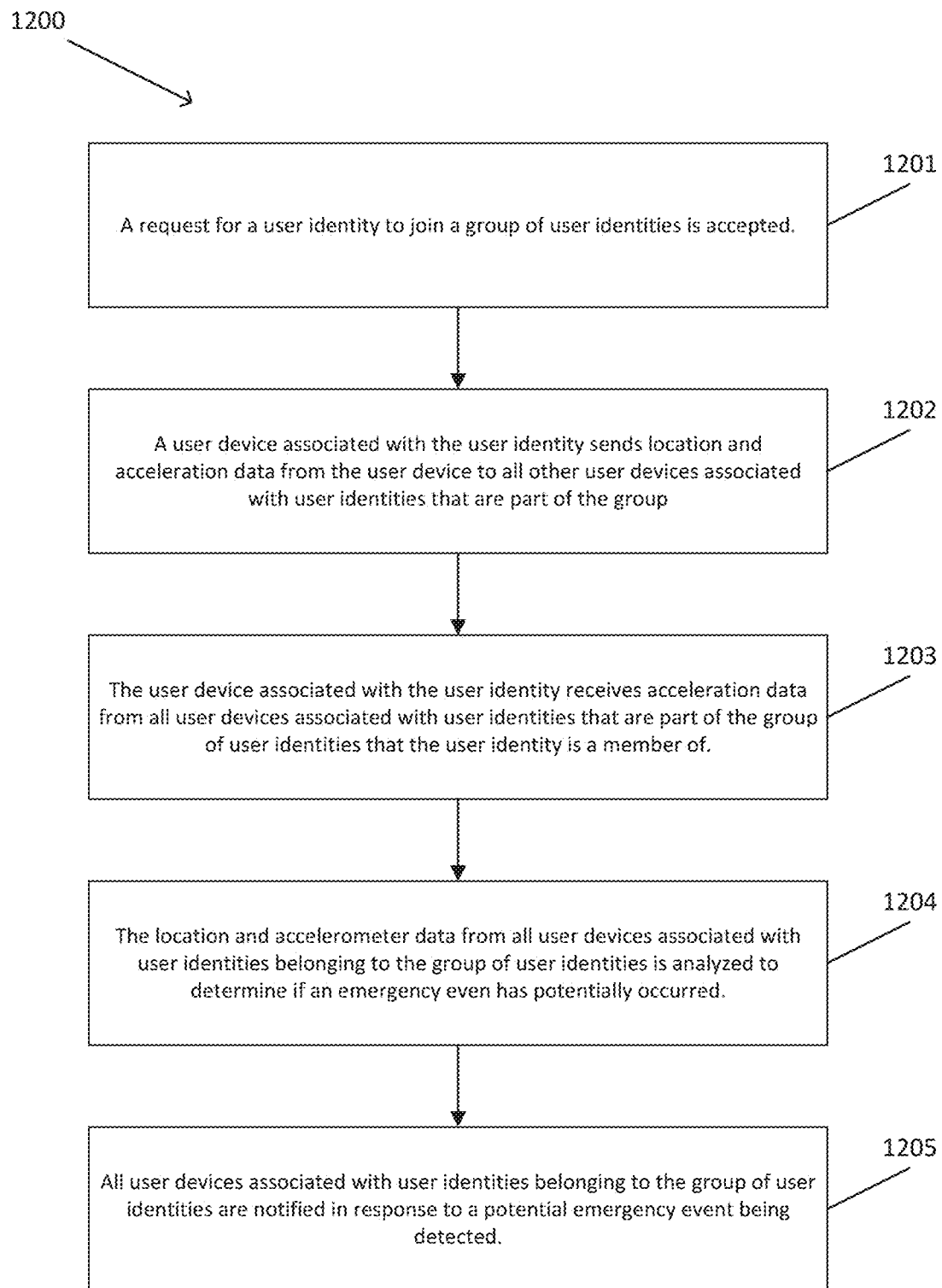
FIG. 12 illustrates a flow diagram of a method that facilitates the sharing of rider data among a group of riders and detection of a potential emergency event in accordance with various aspects described herein.

Turning now to FIG. 12, presented is a flow diagram of a method 1200 that facilitates the sharing of rider data among a group of riders and detection of potential emergency events. At 1201, a request for a user identity to join a group of user identities is accepted. At 1202, a user device associated with the user identity sends location and acceleration data from the user device to all other user devices associated with user identities that are part of the group of user identities of which the user identity is a member. At 1203, the user device associated with the user identity receives acceleration data from all user devices associated with user identities that are part of the group of user identities of which the user identity is a member. At 1204, the location and accelerometer data from all user devices associated with user identities belonging to the group of user identities is analyzed to determine if an emergency event has potentially occurred. At 1205, all user devices associated with user identities belonging to the group of user identities are notified in response to a potential emergency event being detected.

Figure 13:
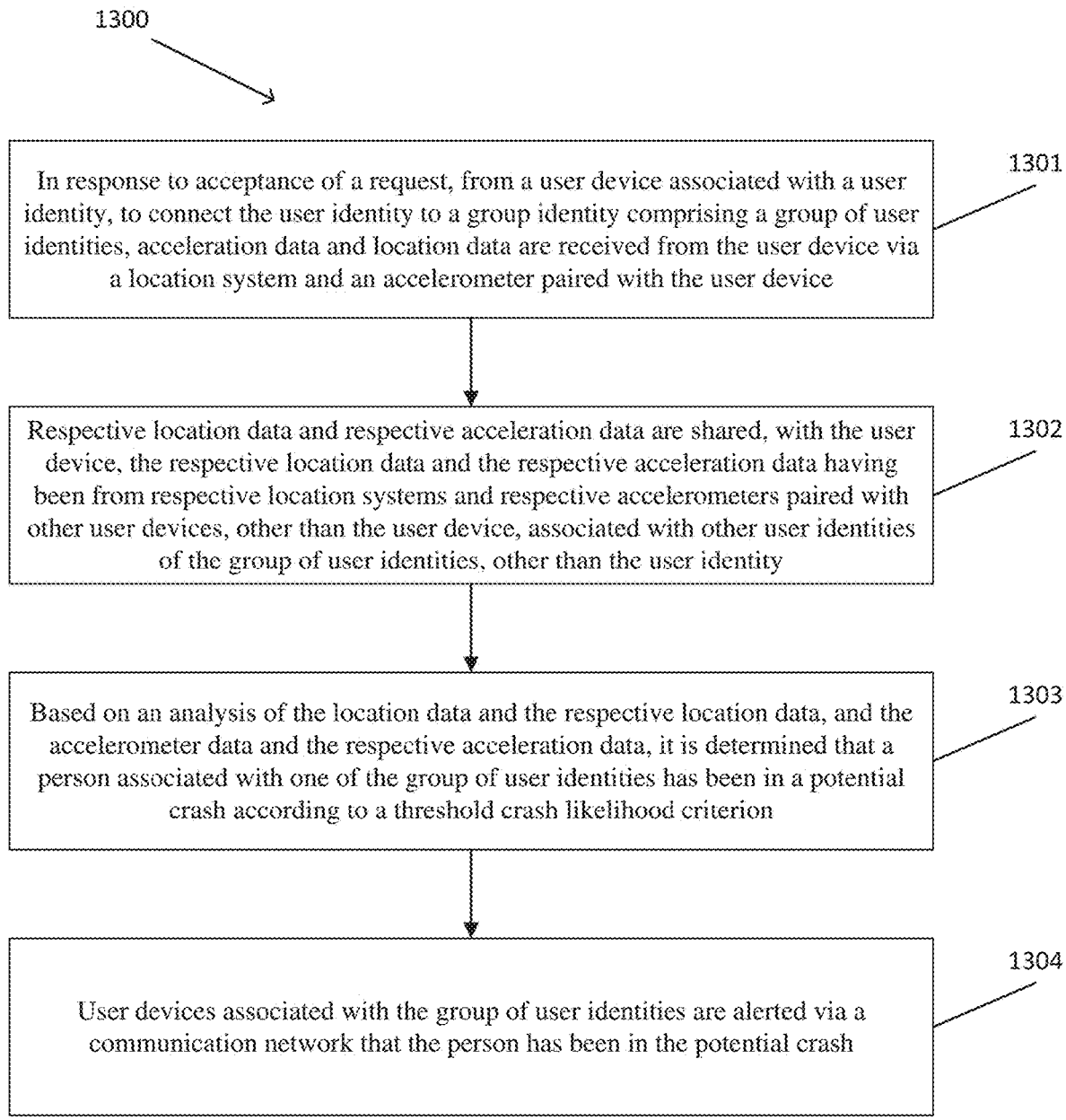
FIG. 13 illustrates a flow diagram of a method that facilitates the sharing of rider data among a group of riders and detection of a potential emergency event in accordance with various aspects described herein.

Turning now to FIG. 13, presented is an example, non-limiting method 1300 in accordance with an embodiment, in which, at 1301, in response to acceptance of a request, from a user device associated with a user identity, to connect the user identity to a group identity comprising a group of user identities, acceleration data and location data are received from the user device via a location system and an accelerometer paired with the user device. At 1302, respective location data and respective acceleration data are shared, with the user device, the respective location data and the respective acceleration data having been from respective location systems and respective accelerometers paired with other user devices, other than the user device, associated with other user identities of the group of user identities, other than the user identity. At 1303, based on an analysis of the location data and the respective location data, and the accelerometer data and the respective acceleration data, it is determined that a person associated with one of the group of user identities has been in a potential crash according to a threshold crash likelihood criterion. At 1304, user devices associated with the group of user identities are alerted via a communication network that the person has been in the potential crash.

Optionally, the alerting of the user devices at 1304 can comprise sending a text message to the user devices, where the text message comprises text data, generated by the system, representative of text that is descriptive of the potential crash or geographic separation experienced by the person. Also, the alerting of the user devices at 1304 can comprise sending an audio message to be rendered by the user devices, where the audio message comprises audio data, generated by the system, representative of audio that is descriptive of the potential crash or geographic separation experienced by the person.

Figure 14:
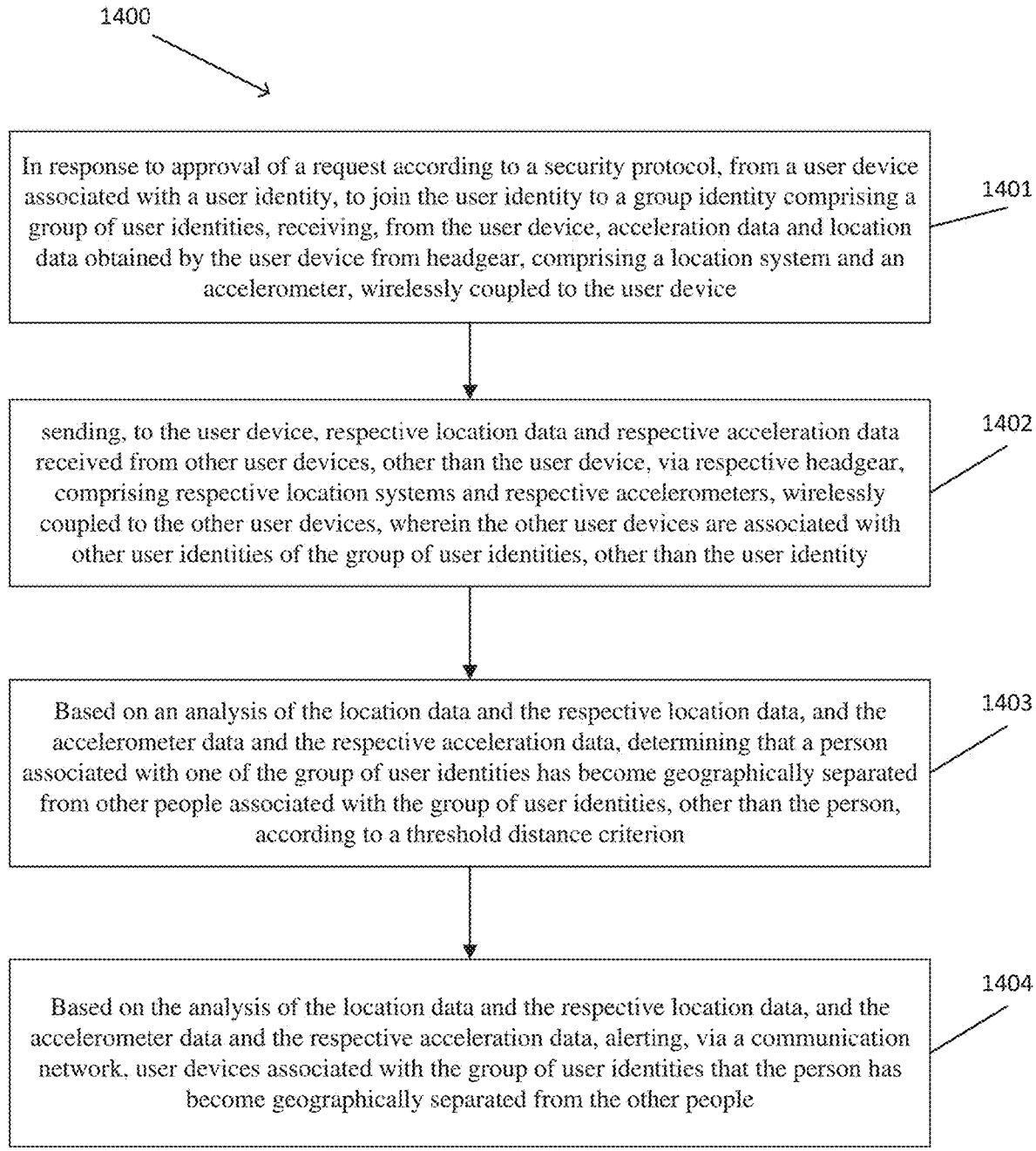
FIG. 14 illustrates a flow diagram of a method that facilitates the sharing of rider data among a group of riders and detection of a potential separation event in accordance with various aspects described herein.

Turning now to FIG. 14, presented is a flow diagram of operations 1400 associated with a non-transitory machine-readable medium, comprising executable instructions that, when executed by a processor, facilitate performance of the operations 1400. The operations 1400 can comprise, in response to approval of a request according to a security protocol, from a user device associated with a user identity, to join the user identity to a group identity comprising a group of user identities, receiving 1401, from the user device, acceleration data and location data obtained by the user device from headgear, comprising a location system and an accelerometer, wirelessly coupled to the user device. The operations 1400 can further comprise sending 1402, to the user device, respective location data and respective acceleration data received from other user devices, other than the user device, via respective headgear, comprising respective location systems and respective accelerometers, wirelessly coupled to the other user devices, wherein the other user devices are associated with other user identities of the group of user identities, other than the user identity.

Further, the operations 1400 comprise, based on an analysis of the location data and the respective location data, and the accelerometer data and the respective acceleration data, determining 1403 that a person associated with one of the group of user identities has become geographically separated from other people associated with the group of user identities, other than the person, according to a threshold distance criterion. Further, based on the analysis of the location data and the respective location data, and the accelerometer data and the respective acceleration data, the operations 1400 can comprise alerting 1404, via a communication network, user devices associated with the group of user identities that the person has become geographically separated from the other people.

Optionally, as part of the receiving 1401, the approval of the request according to the security protocol can comprise receiving entry of a password associated with the group identity, or, the approval of the request according to the security protocol can comprise receiving input associated with a user identity, associated with the group identity, that has been designated for the approval relating to modification of a number of identities in the group of user identities. As another option, the approval of the request according to the security protocol can comprise sending a message to the user device associated with the user identity comprising an invitation that invites the user identity to become part of the group identity, and receiving a reply message from the user device affirming the invitation.

In an embodiment, emergency event could serve as a class of events that all warrant examination and detection by the emergency detection component. For example, both a potential crash and geographic separation from the group could be classed as emergency events. As such, all group members would be notified if data from any user indicated that one of these events had occurred, with a corresponding notification identifying what event type had occurred, to which group member or members and the location of the event. Additional possible emergency events include loss of data connection to a group member, a group member exceeding a specific speed, erratic control of a vehicle, traffic congestion, and/or vehicle performance issues.

FIGS. 12-14 as described above, as well as other description of embodiments herein, illustrates a method in accordance with certain aspects of this disclosure. While, for purposes of simplicity of explanation, this method has been shown as described as a series of acts, it is to be understood an appreciated that this disclosure is not limited by the order of acts, as some acts may occur in different orders and/or concurrently with other acts from that shown and described herein. For example, those skilled in the art will understand and appreciate that the method can alternatively be represented as a series of interrelated states or events, such as in a state diagram. Moreover, not all illustrated acts may be required to implement methods in accordance with certain aspects of this disclosure.

Figure 15:
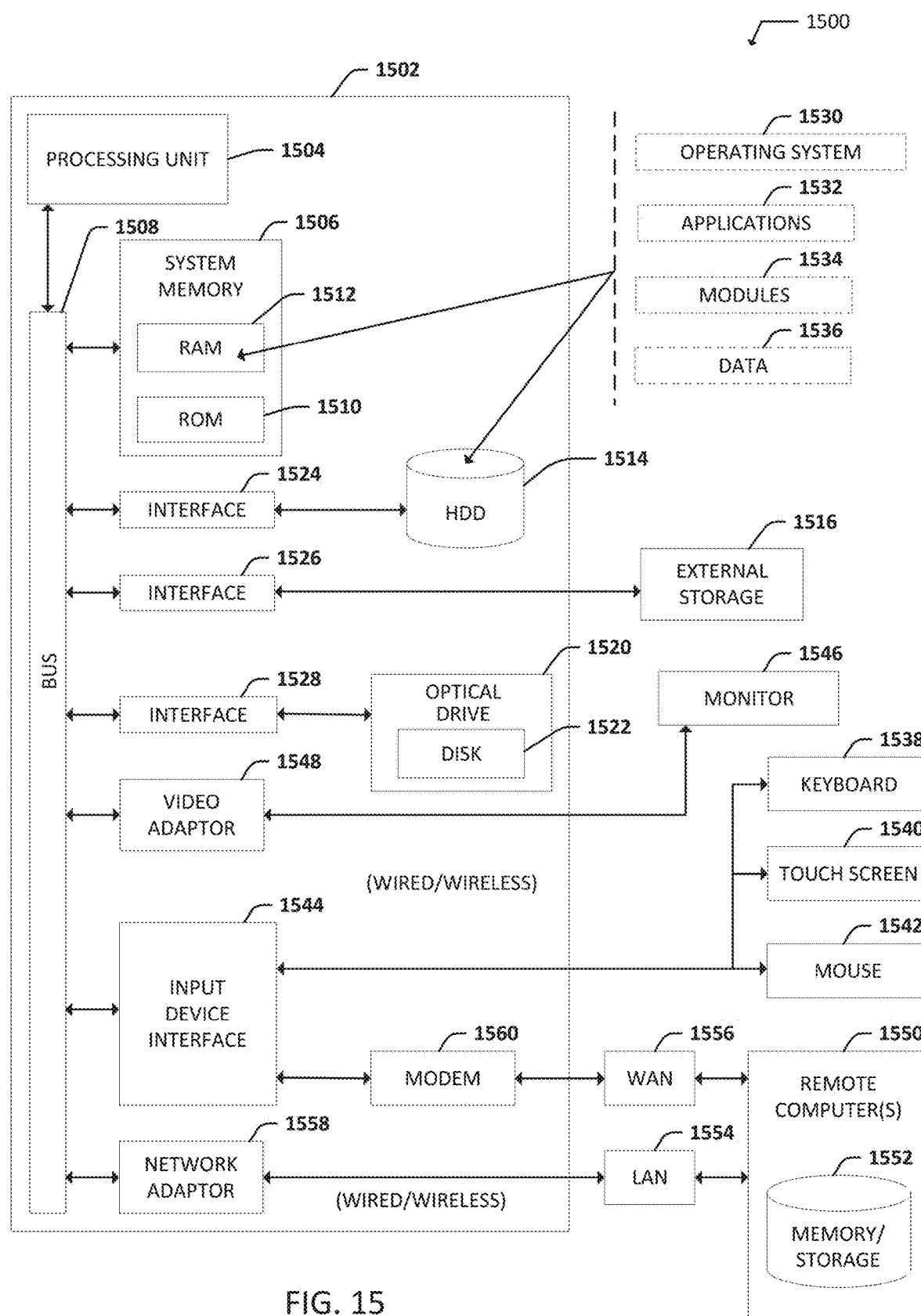
FIG. 15 is an example, non-limiting computing environment in which one or more embodiments described herein can be implemented

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown).

Additionally, while not shown in environment 1500, a solid state drive (SSD) could be used in addition to, or in place of, an HDD 1514. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1594 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enable with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1594 serial port, a game port, a USB port, an IR interface, a Bluetooth interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wi-Fi and Bluetooth wireless technologies. Thus, the communication can be a predefined structure as with a conventional network or simply an ad hoc communication between at least two devices.

Figure 16:
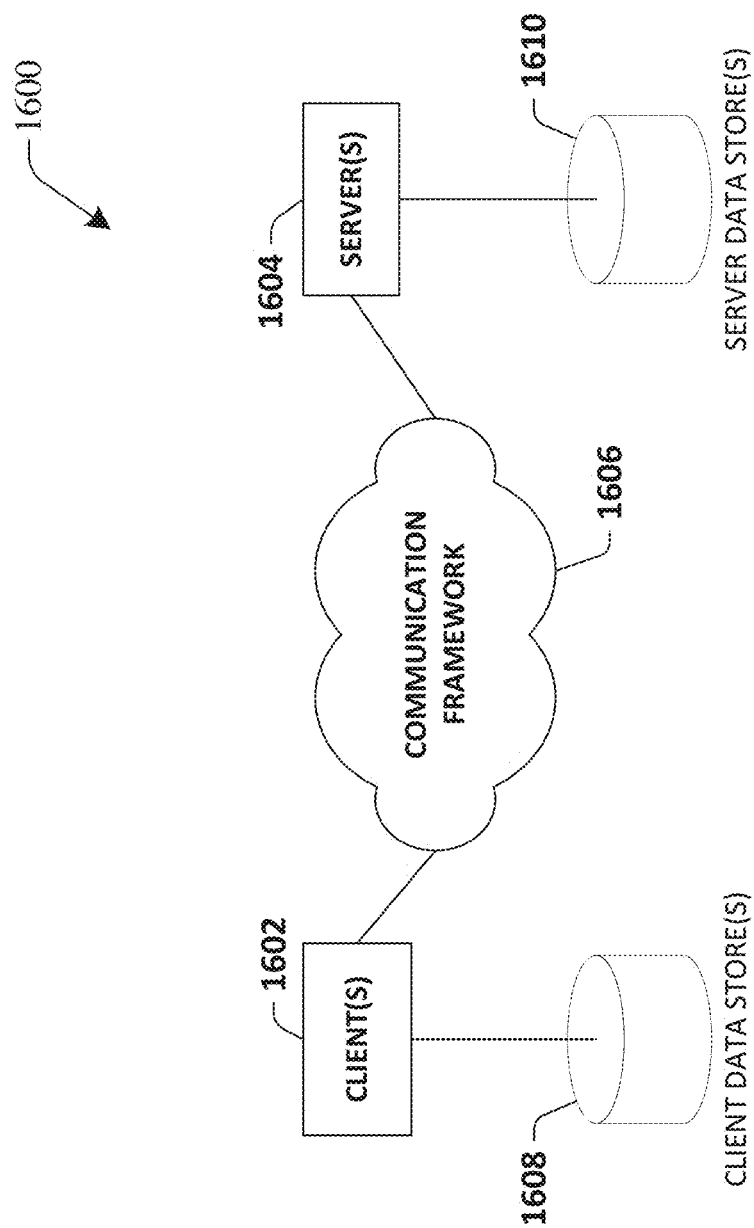
FIG. 16 is an example, non-limiting networking environment in which one or more embodiments described herein can be implemented.

Referring now to FIG. 16, there is illustrated a schematic block diagram of a computing environment 1600 in accordance with this specification. The system 1600 includes one or more client(s) 1602, (e.g., computers, smart phones, tablets, cameras, PDA's). The client(s) 1602 can be hardware and/or software (e.g., threads, processes, computing devices). The client(s) 1602 can house cookie(s) and/or associated contextual information by employing the specification, for example.

The system 1600 also includes one or more server(s) 1604. The server(s) 1604 can also be hardware or hardware in combination with software (e.g., threads, processes, computing devices). The servers 1604 can house threads to perform transformations of media items by employing aspects of this disclosure, for example. One possible communication between a client 1602 and a server 1604 can be in the form of a data packet adapted to be transmitted between two or more computer processes wherein data packets may include coded analyzed headspaces and/or input. The data packet can include a cookie and/or associated contextual information, for example. The system 1600 includes a communication framework 1606 (e.g., a global communication network such as the Internet) that can be employed to facilitate communications between the client(s) 1602 and the server(s) 1604.

Communications can be facilitated via a wired (including optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1610 that can be employed to store information local to the servers 1604.

In one exemplary implementation, a client 1602 can transfer an encoded file, (e.g., encoded media item), to server 1604. Server 1604 can store the file, decode the file, or transmit the file to another client 1602. It is to be appreciated, that a client 1602 can also transfer uncompressed file to a server 1604 and server 1604 can compress the file and/or transform the file in accordance with this disclosure. Likewise, server 1604 can encode information and transmit the information via communication framework 1606 to one or more clients 1602.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system associated with a user identity, comprising:
a memory that stores computer executable components;
a processor, operably coupled to the memory, and that executes computer executable components stored in the memory, wherein the computer executable components comprise:
a pairing component that pairs the system with a wireless transceiver mountable to or within headwear, the wireless transceiver being communicatively coupled to a location system that outputs location data representative of a location associated with the user identity, an accelerometer that outputs accelerometer data representative of an acceleration associated with the user identity, and a vitals monitoring system that outputs vital signs associated with the user identity;
a communications component that communicates with the wireless transceiver, and obtains the location data and the accelerometer data;
a group management component that enables
creation of a group of user identities comprising the user identity and other designated user identities other than the user identity, based on receiving respective validations to join the group of user identities from respective user devices associated with the other designated user identities after sending respective requests to join the group to the respective user devices,
modification of a number of identities in the group of user identities, and
deletion of the group of user identities;
an emergency event detection component that identifies an emergency event associated with the user identity based on at least one of user input associated with the user identity, the accelerometer data or the location data, and generates emergency event data representative of the emergency event, wherein the data representative of the emergency event comprises vital signs of the user identity associated with the emergency event; and
a group sharing component that enables sending of first information to the respective user devices, enables sending, in response to the emergency event, the emergency event data to the respective user devices, and enables receiving of second information from any of the respective user devices.

2. The system of claim 1, wherein the headwear is a protective helmet.

3. The system of claim 1, wherein the modification of the group of user identities is enabled after reception of a common password associated with the group that was generated during the creation of the group, wherein the deletion of the group of user identities is enabled after reception of the common password, and wherein the respective validations are enabled after reception of the common password.

4. The system of claim 1, wherein the wireless transceiver comprises at least one of a Wi-Fi transceiver, a Bluetooth transceiver, or a communications network transceiver.

5. The system of claim 1, wherein the accelerometer and the location system are at least one of mounted within, or mountable to, the headwear.

6. The system of claim 1, further comprising:
the location system;
the accelerometer, wherein the pairing component pairs the accelerometer and the location system of the system with the wireless transceiver; and
a vehicle status component that shares data about a vehicle associated with the user identity with the respective user devices.

7. The system of claim 1, wherein the location system comprises at least one of a global positioning system component, a Wi-Fi network location system, or a communications network location system.

8. The system of claim 1, wherein the system is mounted to or within the headwear.

9. The system of claim 1, further comprising an audio output device that renders audio data determined from messages received from the respective user devices, and wherein the audio output device renders the audio data determined from the messages based on a text to speech conversion process applies to the messages.

10. The system of claim 1, wherein the headwear comprises an augmented reality display, and wherein the augmented reality display renders emergency information in response to reception of other emergency event data from a user device of the respective user devices related to an emergency that has happened associated with one of the user identities of the group of identities.

11. The system of claim 1, wherein the augmented reality display renders at least one of route information or direction information related to a route or direction to undergo, respectively, in order to move to an area where the emergency associated with the one of the user identities happened.

12. The system of claim 1, wherein the computer executable components further comprise a navigational component that enables generation and sharing of route data, with the respective user devices, representative of a navigational route to be followed by members of the group of user identities as part of participation in the group.

13. The system of claim 12, wherein the system comprises a smartphone comprising the navigational component, and wherein the communications component interfaces with the headgear via the wireless transceiver to render information related to the navigational route.

14. A method, comprising:
in response to acceptance of a request, from a user device associated with a user identity, to connect the user identity to a group identity comprising a group of user identities,
receiving, from the user device, acceleration data location data, and vital signs from a location system, an accelerometer paired with the user device, and a vitals monitoring system that outputs vital signs associated with the user identity;
sharing, with the user device, respective location data and respective acceleration data from respective location systems and respective accelerometers paired with other user devices, other than the user device, associated with other user identities of the group of user identities, other than the user identity; and
based on an analysis of the location data and the respective location data, and the accelerometer data and the respective acceleration data,
determining that a person associated with one of the group of user identities has been in a potential crash according to a threshold crash likelihood criterion, and
alerting, via a communication network, user devices associated with the group of user identities that the person has been in the potential crash and the vital signs associated with the user identity.

15. The method of claim 14, wherein the alerting of the user devices comprises sending a text message to the user devices, and wherein the text message comprises text data, generated by the system, representative of text that is descriptive of the potential crash or geographic separation experienced by the person.

16. The method of claim 14, wherein the alerting of the user devices comprises sending an audio message to be rendered by the user devices, and wherein the audio message comprises audio data, generated by the system, representative of audio that is descriptive of the potential crash or geographic separation experienced by the person.

17. A non-transitory machine-readable medium, comprising executable instructions that, when executed by a processor, facilitate performance of operations, comprising:

in response to approval of a request according to a security protocol, from a user device associated with a user identity, to join the user identity to a group identity comprising a group of user identities, receiving, from the user device, acceleration data, location data, and vital signs obtained by the user device from headgear, comprising a location system, an accelerometer, and a vitals monitoring system, wirelessly coupled to the user device, and sending, to the user device, respective location data and respective acceleration data received from other user devices, other than the user device, via respective headgear, comprising respective location systems and respective accelerometers, wirelessly coupled to the other user devices, wherein the other user devices are associated with other user identities of the group of user identities, other than the user identity; and based on an analysis of the location data and the respective location data, and the accelerometer data and the respective acceleration data, determining that a person associated with one of the group of user identities has become geographically separated from other people associated with the group of user identities, other than the person, according to a threshold distance criterion, and alerting, via a communication network, user devices associated with the group of user identities that the person has become geographically separated from the other people and outputting the vital signs of the user identity that has become geographically separated.

18. The non-transitory machine-readable medium of claim 17, wherein the approval of the request according to the security protocol comprises receiving entry of a password associated with the group identity.

19. The non-transitory machine-readable medium of claim 17, wherein the approval of the request according to the security protocol comprises receiving input associated with the user identity, to be associated with the group identity, that has been designated for the approval relating to modification of a number of identities in the group of user identities.

20. The non-transitory machine-readable medium of claim 17, wherein the approval of the request according to the security protocol comprises sending a message to the user device associated with the user identity comprising an invitation that invites the user identity to become part of the group identity, and receiving a reply message from the user device affirming the invitation.

* * * * *